3,763,269
POLYESTERS FROM TRIS(2-HYDROXYALKYL)
ISOCYANURATE HOMOPOLYMERS
Robert L. Formaini, Millington, N.J., assignor to Allied
Chemical Corporation, New York, N.Y.
No Drawing. Continuation-in-part of abandoned application Ser. No. 715,512, Mar. 25, 1968. This application Feb. 18, 1969, Ser. No. 800,263
Int. Cl. C08g 17/06, 39/10
U.S. Cl. 260—75 UA    2 Claims

ABSTRACT OF THE DISCLOSURE

Homopolymers of tris(2-hydroxyalkyl)isocyanurate are polyesterified with polycarboxylic acid. The polyesters may be modified with polyisocyanate, metal drier, phenol-formaldehyde or triazine-formaldehyde resins, or polyhydric alcohols to provide electrical insulator material for wire enamels and varnishes, and can also form ester-imide copolymers.

The homopolymer is prepared by dissolving the isocyanurate monomer and acid catalyst in water and then azeotroping off the solvent water and up to 0.75 mol of water of condensation per mol of isocyanurate monomer.

CROSS-REFERENCE TO RELATED APPLICATIONS

This application is a continuation-in-part of copending application Ser. No. 715,512, filed Mar. 25, 1968, now abandoned.

BACKGROUND OF THE INVENTION

This invention relates to novel resinous compositions; in particular it relates to polyesters derived from polycarboxylic acids and homopolymers of tris(2-hydroxyalkyl)isocyanurate.

Tris(2-hydroxyethyl)isocyanurate homopolymer is a clear, solid resinous product discussed in Fitz-William U.S. Pat. 3,293,224. This hard material possesses high resistance to water and is known to be useful in the adhesive, coating and molding resin fields. However, polycondensation products of the homopolymer, in particular polyester derived from polycarboxylic acids and the homopolymer, are not known in the prior art.

SUMMARY OF THE INVENTION

The novel materials of the instant invention are polyesters of a polycarboxylic acid and homopolymer of tris-(2-hydroxyalkyl)isocyanurate, wherein each 2-hydroxyalkyl group contains between 2 and 4 carbon atoms. A preferred example of these isocyanurates, has the formula

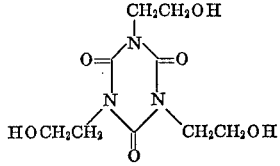

The polyester compositions are useful in the preparation of wire enamels and varnishes of superior quality, which can be advantageously used to provide insulating coatings for electrical conductors. These and other uses for these novel polyesters will be more fully disclosed hereinafter.

The homopolymer is prepared by dissolving the isocyanurate monomer and acid catalyst in water and then azeotroping off the solvent water and up to 0.75 mol of water of condensation per mol of isocyanurate monomer.

DETAILED DESCRIPTION OF THE INVENTION

It has been found that the reaction product of a polycarboxylic acid and a tris(2-hydroxyalkyl)isocyanurate homopolymer affords useful polyester compositions. The tris(2-hydroxyalkyl)isocyanurates which may be employed for this purpose are those of the formula

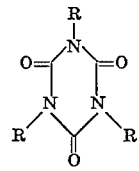

wherein R is 2-hydroxyalkyl radical containing at least two carbon atoms, preferably 2 to 4 carbon atoms. Especially preferred is the tris(2-hydroxyethyl) compound, the use of which is described in more detail hereinafter. The isocyanurates are readily obtained by procedures taught by Little U.S. Pat. 3,088,914.

The homopolymers from which the instant polyesters are derived are generally made according to procedures taught by aforesaid U.S. Pat. 3,293,224. However, certain alterations or precautions are preferably employed to obtain homopolymer material best suited for subsequent polyesterification.

The homopolymerization process may be carried out in an inert solvent such as Solvesso 100, xylene, xylenol, phenol, toluene and similar solvents which form azeotropes with water at an adequate temperature. Also, it is possible to homopolymerize in the absence of solvent under fusion conditions.

It is essential that an etherification-type condensation catalyst be employed to produce the homopolymers. These catalysts have high dissociation constants and produce a pH ranging between about 0 and 6. Suitable examples of the catalyst include sulfuric acid, phosphoric acid, boron trifluoride and its hydrates, trichloroacetic acid, aromatic sulfonic acids such as benzenesulfonic acid and toluenesulfonic acid, and the like.

Although the quantity of catalyst may vary over a large range it is preferred to employ the catalyst in an amount of about 0.5 to 2% by weight of tris(2-hydroxyethyl) isocyanurate. The amount of catalyst used must be sufficient to afford a controlled pH level, less than about 6.0 throughout the reaction.

The reaction temperature should be retained above about 150° C. in order to facilitate the homopolymerization, but below about 250° C. at which temperature the product begins to become colored. It has been found to be advantageous to hold the temperature at about 130–140° C. initially and then to raise it to about 225–240° C. for the remainder of the polymerization reaction.

Atmospheric or subatmospheric pressure may be utilized. Atmospheric pressure is preferred when azeotroping conditions are employed. When no solvent is employed, subatmospheric pressure is preferred. Any temperature and pressure parameters which result in removal of the water of reaction either by simple distillation or by azeotroping, are suitable.

The polymerization time may vary over a large range depending upon the temperature and catalyst employed. Homopolymerization may proceed until about 1.5 mol of water is condensed out per mol of isocyanurate originally charged. However, when more than about 0.75 mol of water per mol of isocyanurate is condensed, the homopolymer which results is an intractable material which leads to polyesters of low solubility in coating solvents. Therefore, it is preferred to condense out less than about 0.75 mol of water per mol of isocyanurate and more preferably between about 0.20 and 0.60 mol of water per mol of isocyanurate. Most preferably, about 0.50 mol of water will be condensed. Inasmuch as the reaction temperature normally is greater than 150° C., this water is driven off and may be condensed and collected as a means of monitoring the progress of the reaction.

However, it may be desirable to obtain homopolymers from which more than 0.75 mol of water per mol of isocyanurate has been condensed. In this event, the homopolymerization would be allowed to continue accordingly, and subsequent polyesterification will be conducted under appropriate conditions, for example by fusion of the polycarboxylic acid and homopolymer.

Alternative measures for determining when the polymerization reaction should be terminated include the viscosity or the hydroxyl number of the homopolymer product.

The homopolymerization reaction can be conducted in any appropriate inert reactor.

The resulting homopolymer is a viscous liquid at elevated temperatures, such as the reaction temperature, which is converted to a solid resinous product upon cooling. This solid product can then be ground to a fine powder.

It has been found that the method of aforesaid U.S. Pat. 3,293,224 for making tris(2-hydroxyethyl)isocyanurate homopolymer, which involves fusing the monomer in the presence of catalyst, is not entirely satisfactory. Since the tris(2-hydroxyethyl)isocyanurate has a high heat of fusion, a great deal of heat must be supplied to the reactor for an extended period of time in order to fuse the monomer and raise its temperature to at least 150° C. In fact, in order to accomplish this with large quantities of material it has been necessary to raise the skin temperature of the reactor, i.e., the temperature of the reactor wall exposed to the reaction mixture, as high as 230° C. and even higher for periods as long as thirty hours and even longer. When reaction temperatures are desired closer to the upper limits of the 150–250° C. range even more strenuous heating has been required. Furthermore, after the reaction mass finally reaches the desired temperature, it is necessary to maintain the high temperature for a substantial time for polymerization to occur. Aforesaid U.S. Pat. 3,293,224 was able to keep this actual reaction time relatively short by utilizing pressures of about 20–25 mm. Hg. In the absence of such reduced pressures, substantially longer reaction times would be required, and it is for this reason that subatmospheric conditions are said to be preferred.

However, prolonged strenuous heating and the use of reduced pressure are to be avoided if possible since they introduce engineering and economy problems into the process. Furthermore, and more important, heating tris-(2-hydroxyethyl)isocyanurate at reduced pressure at 150–250° C., the preferred conditions of said U.S. Pat. 3,293,-224, affords substantial amounts of decomposition products as disclosed in U.S. Pat. 3,108,115. These side reactions are greatly facilitated by the high skin temperatures and prolonged heating time required by the process of U.S. Pat. 3,293,224. Thus, not only is that process uneconomical, but it also affords substantial quantities of 2-oxazolidone and other decomposition products.

According to a feature of the instant invention, the above disadvantages of the U.S. Pat. 3,293,224 process are largely overcome by dissolving the tris(2-hydroxyethyl) isocyanurate monomer and acid catalyst in water and azeotroping off the solvent water and up to about 0.75 mol of water of condensation per mol of isocyanurate. Reduced pressures, high skin temperatures, and prolonged heating are not necessary, thereby affording a faster, more economical reaction with formation of a minimum of side products.

In describing the instant process, distinction is drawn between solvent water, i.e., water in which the isocyanurate is dissolved, and water of condensation, i.e., water formed as a product of the homopolymerization reaction.

In conducting this process, the isocyanurate is first dissolved in water along with the acidic catalyst. The amount of water employed as solvent is not critical, but since it is to be removed during the process it is preferred to use a minimum amount, for example, between about 10 and 30 parts by weight per 100 parts isocyanurate. More preferably, between about 15 and 25 parts per 100 parts isocyanurate will be employed. The isocyanurate may either be added to cold water and the resulting slurry heated to obtained dissolution, or it may be added to pre-heated water to obtain immediate dissolution. The latter technique is preferred due to ease of handling and faster dissolution, with the water being preheated, for example, to at least about 80° C., more preferably between about 90° C. and reflux.

After the isocyanurate is dissolved in the water, a second solvent is added to the reactor for the purpose of azeotroping off the solvent water and water of condensation. For this purpose, it is necessary to employ as the second solvent a material which will permit azeotropic distillation of the water at a temperature less than about 250° C., beyond which temperature the product becomes colored. Solvents which may be used for removing the water include Solvesso 100 (a mixture of aromatic naphthas, xylene and methylbenzenes), xylene, xylenol, toluene, mineral spirits (a mixture of naphthenes, paraffins and aromatics), etc. Other azeotroping solvents which are familiar to those skilled in the art and which will not react with the isocyanurate under reaction conditions may, of course, be employed. The selection of solvent is not crtical, but is influenced by cost, efficiency, chemical inertness and distillation temperature. The amount of azeotroping solvent added to the reactor is also not critical, being limited only by the capacity of the reactor and condenser system; sufficient solvent should be employed to maintain a reflux thereof.

In addition to doing away with the high skin temperatures and prolonged heating times required heretofore, the instant process also permits conducting the polymerization at lower temperatures. It is preferred to azeotrope off the solvent water and water of condensation at reaction temperatures within the range of about 120–210° C., more preferably with the range of about 130–200° C. In order to remove the preferred 0.5 mol of water of condensation per mol of isocyanurate monomer, the final temperature of the reaction mass will normally be about 150° C. or higher.

It is preferred to maintain the temperature of the reaction mass (and skin temperature of the reactor) less than about 180° C., more preferably less than about 175° C., until the volume of water azeotroped off is at least approximately equal to the volume of solvent water utilized in order to minimize the decomposition of isocyanurate monomer. (This restriction is not readily attainable in the process of U.S. Pat. 3,293,224 since the high heat of fusion requires strenuous heating.) In this regard, it is noted that some water of condensation will be removed even before the solvent water is completely removed; for example, if 65 parts of solvent water are employed in the reaction mixture, a minor proportion of the first 65 parts of water azeotroped off represents water of condensation. Thus, it is preferred to restrict the temperature of the reaction mass until at least a substantial portion of the homopolymer has been formed, since once the polymerization begins it proceeds relatively quickly.

In addition to avoiding strenuous heating conditions and substantial decomposition, the instant process permits much faster cycle times than possible heretofore, primarily because the slow process of fusing dry monomer is avoided. In this way it is possible to produce greater quantities of the desired product without increasing the capacity of reactors utilized heretofore. It is typical with the present invention to reduce the time required for heating the material to desired temperatures to as little as 10% of the time required heretofore, thereby achieving a corresponding increase in efficiency.

Considerations regarding catalyst in the instant process are the same as those discussed hereinbefore and in U.S. Pat. 3,293,224.

Acid ingredients which may be used in the preparation of the instant polyesters include free polycarboxylic acids, acyl halides thereof, e.g. diacid chlorides, and lower dialkyl esters. Mixed functional polybasic acids as well as the anhydrides of the polycarboxylic acids may also be employed if desired. Among the acids which may be employed are benzene dicarboxylic acids, such as phthalic, isophthalic and terephthalic acids; trimellitic; fumaric; succinic, adipic, sebacic, azelaic, maleic, tetrahydrophthalic, acrylic acid and substituted acrylic acids, itaconic, acids; endo-bis-5-norbornene-2,3-dicarboxylic acid; and isomers of methylbicyclo(2.2.1)heptene - 2,3 - dicarboxylic acid. Preferably terephthalic or isophthalic acids or trimellitic anhydride, especially terephthalic, are employed.

The polyesterification reaction may be most conveniently conducted by adding the acid ingredient directly to the reaction kettle in which the homopolymer has been prepared, along with any modifying ingredients which may be desired according to considerations discussed hereinafter. However, the homopolymer may be isolated first if desired.

In making the polyester, at least about 50 equivalent percent of hydroxyl material should be employed, and preferably greater than 52 equivalent percent of hydroxyl material will be used. The balance will be the carboxyl material. The amount of hydroxyl material employed is specified herein in terms of equivalents since the alcohol and acid react on an equivalent basis rather than on a molar basis.

After addition of the acid ingredient, heating of the reaction mixture is continued at an elevated temperature between about 150° C. and 250° C. and preferably at about 200–225° C., until the desired acid number is obtained. Usually, preferred products will have an acid number less than about 60, although higher acid numbers may be desirable depending upon molecular weight and end use criteria. The acid number of the polyester product can be determined by procedures well known to those with skill in the art. An acid number is defined as the number of milligrams of potassium hydroxide required to neutralize one gram of sample.

At this point, the solvent can be stripped off under vacuum and the resulting mass cooled to afford the final polyester product. To obtain wire enamels, however, the reaction mixture may be dissolved in cresylic acid or other appropriate solvents, and modified in a manner appropriate to obtaining superior compositions.

While the homopolymer can be employed as the sole polyhydric alcohol in the instant polyesters, it can also be replaced in part by one or more other polyhydric alcohols. As little as about 5% by weight of the total polyhydric alcohol can be the homopolymer, but preferably at least about 20% by weight will be homopolymer. On an equivalent basis, preferably at least about 5% of total polyhydric alcohol content will be the homopolymer.

Modifying polyhydric alcohols which may be employed in this fashion include ethylene glycol; glycerine; pentaerythritol; 1,1,1-trimethylolethane; 1,1,1-trimethylolpropane; sorbitol; mannitol; dipentaerythritol; $\alpha,\omega$-aliphatic hydrocarbon diols having 4 to 5 carbon atoms, e.g., butanediol-1,4; pentanediol-1,5; butene-2-diol-1,4; and butyne-2-diol-1,4; and cyclic glycols, e.g., 2,2,4,4-tetramethyl-1,3-cyclobutanediol, hydroquinone di beta hydroxyethyl ether and 1,4-cyclohexanedimethanol.

When a modifying polyhydric alcohol is used, it can be added to the polyesterification reaction mixture along with the other components according to procedures well known to those skilled in the art. However, when the polycarboxylic acid is partially esterified with the homopolymer prior to further esterification with a modifying glycol, an excellent product is obtained. Furthermore, when this two-step process is modified by employing cresylic acid during the esterification a preferred composition is obtained.

The glycols which may be advantageously used in this two-step process may vary widely. In general, they are the glycols conventionally used in preparing polyesters, including alkylene glycol of the formula $H(OR)_nOH$ where $n$ is 1–10 or higher and R is alkylene, e.g., ethylene, propylene, butylene, etc. For example, ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, xylylene glycol, etc. Preferably an alkylenediol, especially ethylene glycol will be used.

The flexibility of insulated coatings prepared from the instant polyesters may be improved by preparing a high functionality polyester and, separately, a low or intermediate functionality polyester and then blending the two together to form a solution of both which is used to coat the electrical conductors. By employing such blends the excellent properties of heat shock and thermal stability or thermal life are obtained in combination with a surprising and significant improvement in flexibility.

The high functionality or extensively cross-linked polyester resins are derived from certain proportions of diacid ingredient in a reaction with the homopolymer. Small amounts of dihydroxy compounds may be included, but the amount must be limited so that the functionality or cross-linking is not significantly diminished. The amount of dihydroxy compound can be as high as about 10% of the homopolymer used. The satisfactory dihydroxy compounds include such compounds as ethylene glycol; 1,4-butanediol; neopentyl glycol; 1,5-pentane-diol; 1,6-cyclohexanedimethanol; 2,2,4,4 - tetramethyl-1,3-cyclobutanediol; propylene glycol; and 4,4'-bis(hydroxymethyl)diphenyl ether.

The lower functionality polyester is also derived from certain proportions of the above ingredients, with the equivalent percent of dihydroxy compound approximately equal to the equivalent percent of homopolymer.

It is often desirable to use more than a single acid ingredient in the instant polyester composition. In particular, when the main acid ingredient is aromatic acid, for example terephthalic or isophthalic acid, the aromatic component may be partially replaced by aliphatic dibasic acids to provide improved flexibility to the composition during heat aging. Among the aliphatic dibasic acids which may be used are adipic acid, succinic acid, glutaric acid, pimelic acid, malonic acid, azaleic acid and sebacic acid. Adipic acid is preferred. The aliphatic acid may be substituted for the aromatic acid in an amount between about 20–60 mol percent of total acid content, preferably between about 25–40 mol percent.

In addition, one or more of the polyhydric alcohols listed hereinbefore may be added during the homopolymerization of the isocyanurate, thereby obtaining a modified homopolymer. Preferably, up to about 25% of modifying alcohol may be added to the homopolymerization reaction mixture for this purpose, to afford isocyanurate polyether-type polymer containing a minor amount of heterologous ether linkages.

No special reaction conditions need be employed in preparing these modified homopolymers, since the homopolymerization reaction conditions specified hereinbefore will normally be suitable. However, alterations in the reaction conditions may be made, for example reaction temperature and time and catalyst concentration may be varied.

The polyesters of the instant invention may be advantageously employed for a variety of purposes. For example, they may be used in industrial coatings, laminates, films, electric insulators especially as wire enamels or varnishes, as well as in making molded articles. In solution, they can be used to impregnate cloth, paper, asbestos and the like. They can also be employed in general wherever alkyd resins are useful.

The solvent employed in making a wire enamel is preferably cresylic acid. Cresylic acid has a boiling range of 185° C. to 230° C. and is a mixture of o-, m- and p-cresols. The individual cresols, e.g., para-cresol, meta-cresol or ortho-cresol can be employed, although it is preferred to use the commercial cresylic acid mixture. Other solvents which may be used individually or in admixture with cresylic acid are phenol, xylene, toluene, naphtha and the like.

When used in wire enamel compositions, the instant polyesters may have added thereto small amounts of metal driers to improve the physical properties of the enamel. The metal drier is preferably used in an amount of 0.1 to 1.0% metal based on the total solids in the enamel. Typical metal driers include the zinc, lead, calcium or cadmium linoleates, octoates, and resinates of each of these metals, e.g., zinc resinate, cadmium resinate, lead linoleate, calcium linoleate, zinc naphthenate, lead naphthenate, calcium naphthenate, cadmium naphthenate, zinc octoate, and cadmium octoate. Other suitable metal driers, specifically polyvalent metal driers such as manganese naphthenate and cobalt naphthenate can be employed.

Also, the properties of the polyester can be improved by the addition of a polyisocyanate in an amount up to about 40%, preferably 0.1–15% by weight of the total of polyisocyanate and polyester. Preferably the polyisocyanate will have at least three available isocyanate groups although diisocyanates may be used.

Among the polyisocyanates which can be employed there may be mentioned diisocyanates such as 2,4-tolylene diisocyanate; 2,6-tolylene diisocyanate; cyclopentylene diisocyanate; m-phenylene diisocyanate; p-phenylene diisocyanate; ethylene diisocyanate; butylidene diisocyanate; 1,5-naphthalene diisocyanate; 1,6-hexamethylene diisocyanate; dianisidien diisocyanate; 4,4'-diphenyl ether diisocyanate; 4,4',4''-triphenyl methane triisocyanate (Desmodur R); the cyclic trimer of 2,4-tolylene diisocyanate; the cyclic trimer of 2,6-tolylene diisocyanate; mixtures of the cyclic trimers of 2,4-tolylene diisocyanate and 2,6-tolylene diisocyanate; the trimer of 4,4'-diphenyl methane diisocyanate; trifunctional isocyanate trimers having the formula:

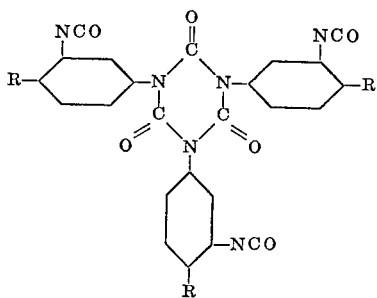

where R is a lower alkyl radical, e.g., n-butyl, tertiary butyl, secondary butyl, isopropyl, methyl, ethyl, etc.; 1,3,5-triisocyanate benzene, 2,4,6-triisocyanate toluene; 4,4'-dimethyl-diphenylmethane; 2,2',5,5'-tetraisocyanate; 2,4,4'-triisocyanate diphenylmethane; 2,4,6-triisocyanato diphenyl ether; 2,2',4-triisocyanate diphenyl ether; 2,2',4-triisocyanate diphenyl sulfide; 2,4,4'-triisocyanato diphenyl sulfide; 2,3',4-triisocyanato - 4' - methyl diphenyl ether; 2,3',4-triisocyanato-4'-methoxydiphenyl ether; 2,4,4'-triisocyanato - 3' - chlorodiphenyl ether; 4,4',6-diphenyl triisocyanate; 1,2,4 butanetriol triisocyanate; 1,3,3-pentane triisocyanate, 1,2,2-butane triisocyanate, phloroglucinol triisocyanate; the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol propane, the reaction product of 3 mols of 2,4-tolylene diisocyanate with 1 mol of trimethylol ethane and, in general, the reaction product of a diisocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric ester. Typical compounds which can be used to block the isocyanate groupings, e.g., by forming carbamates therewith, are monohydric phenols, such as phenol, meta-cresol, para-cresol, ortho-cresol and mixtures thereof; the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro phenol, 4-nitro phenol, 3-nitro phenol; monohydric alcohols such as methyl alcohol, ethyl alcohol, n-propyl alcohol, isopropyl alcohol, tertiary butyl alcohol, tertiary amyl alcohol, octyl alcohol, stearyl alcohol; acetoacetic ester; hydroxyalkylcarbamic acid aryl esters, e.g., hydroxyethylcarbamic acid phenyl ester, hydroxyethylcarbamic acid cresyl ester; diethyl malonate; mercaptans, e.g., 2-mercaptobenzothiazole, 2-mercaptothiazoline, dodecyl mercaptan, ethyl 2-mercaptothiazole, p-naphthyl mercaptan, α-naphthyl mercaptan, methyl mercaptan, butyl mercaptan; lactams, e.g., ε-caprolactam, Δ-valerolactam, γ-butyrolactam, β-propiolactam imides; e.g., succinimide, phthalimide, naphthalimide, glutarimide; dimethylphenyl carbinol; secondary amines, e.g., o-ditolylamine, m-ditolylamine, p-ditolylamine, N-phenyl toluidine, phenyl-α-naphthylamine, carbazole, diphenylamine, etc.; mono-α-phenylethyl phenol; di-α-phenylethyl phenol; tri-α-phenylethyl phenol; carvacrol; thymol; methyl diphenyl carbinol; triphenyl carbinol; 1-nitro tertiary butyl carbinol; 1-chloro-tertiary butyl carbinol; triphenyl silanol; 2,2'-dinitrophenylamine; 2,2'-dichloro diphenylamine; ethyl n-butyl malonate; ethyl benzyl malonate; acetyl acetone; acetonyl acetone; benzimidazole; 1-phenyl-3-methyl-5-pyrazolone.

As specific examples of such blocked polyisocyanates, there may be mentioned Mondur S, wherein the isocyanate groups of the reaction product of 3 moles of mixed 2,4,- and 2,6-tolylene diisocyanate with trimethylolpropane are blocked by esterification with phenol, and Mondur SH, wherein the mixed cyclic trimers of 2,4- and 2,6-tolylene diisocyanates have the three free isocyanate groups blocked by esterification with m-cresol. At present Other blocked polyisocyanates include the cylic trimer of 2,4-tolylene diisocyanate having the isocyanate groups blocked with tertiary butyl alcohol or tertiary amyl alcohol or dimethyl ethinyl carbinol or acetoacetic acid ester or phenol or cresylic acid or ε-caprolactam or 2-mercaptobenzothiazole or succinimide or phthalimide or diphenylamine or phenyl-β-naphthylamine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester, either dry or dissolved in a solvent prior to mixing. The reaction between the polyester and the polyisocyanate is hastened by using elevated temperatures and in preparing wire enamels they are usually reacted at a temperature of about 650–800° F.

It has been further been found that the properties of the polyester wire enamel can be improved by incorporating a tetra-alkyl titanate in place of the metal drier and polyisocyanate. Typical titanates include tetra-alkyl titanates such as tetraisopropyl titanate, tetrapropyl titanate, tetrabutyl titanate, tetraamyl titanate, tetrahexyl titanate, tetraethyl titanate, tetramethyl titanate and diisopropyl dibutyl titanate as well as carbocyclic aryl titanates such as tetraphenyl titanate, tetra cresyl titanate (made from any of the cresol isomers alone or in admixture with each other) and tetraxylenyl titanate. The titanate is used in small amount, e.g., 0.01% to 4.0%, based on the total solids in the wire enamel.

Additional modifying agents may be used in connection with the instant polyesters. For example monocarboxylic acids, either saturated or unsaturated; fatty acids and glyceryl esters, also known as drying oils; natural resins, for example rosin, copals and ester gums, etc.; aldehyde resins formed with urea, triazine and melamine, modified if desired with an alcohol; phenol-aldehyde resins, novolak resins, etc. such as aniline-aldehyde resins; terpenes; Diels-Alder addition products; unsaturated alcohols for example allyl alcohol, etc.; vinyl copolymers; epoxide resins such as the reaction product of epichlorohydrin and bisphenol-A; silicone resins; cellulose acetate resins; polyamide resins such as nylon type resins; buton resins such as styrene-butadiene copolymers modified with maleic; and polyamine such as phenylene diamine, methylene dianiline and the like.

To improve the physical characteristics of a modified insulating composition, it is often helpful to employ a triazine curing agent, for example, a melamine-aldehyde resin or a modified melamine-aldehyde resin such as one modified with an alcohol or its equivalent, such as an alkanol, e.g., methanol, ethanol, propanol, butanol, etc. These modified polyesters may contain between about 1% and 20% by weight of a melamine-formaldehyde resin (or alcohol-modified melamine-formaldehyde resin) based on polyester. Preferably, the resin will be present in an amount between about 3% and 10%, with or without curing agents such as metal catalysts.

Other triazines which may be employed for this purpose include benzoguanamine, formoguanamine, acetoguanamine, lauroguanamine, stearoguanamine, propioguanamine, melamine, etc. Preferably, the triazine is a guanamine, most preferably benzoguanamine. The alkylated melamine-aldehyde resins have better flexibility and heat resistance than the corresponding melamine-aldehyde resins. While there can be employed various aldehydes such as formaldehyde, acetaldehyde, propionaldehyde and furfural, the preferred aldehyde is formaldehyde.

As the alkylating agent there can be used methyl alcohol, ethyl alcohol, propyl alcohol, isopropyl alcohol, butyl alcohol, secondary butyl alcohol, amyl alcohol, hexyl alcohol, cyclohexyl alcohol, octyl alcohol, isoctyl alcohol, 2-ethyl-hexanol. The preferred alcohol is butyl alcohol.

The preferred resin is butylated benzoguanamine-formaldehyde. Other suitable triazine resins include methylated benzoguanamine-formaldehyde,
ethylated benzoguanamine-formaldehyde,
propylated benzoguanamine-formaldehyde,
sec-butylated benzoguanamine-formaldehyde,
amylated benzoguanamine-formaldehyde,
cyclohexylated benzoguanamine-formaldehyde,
octylated benzoguanamine-formaldehyde,
isooctylated benzoguanamine-formaldehyde,
butylated benzoguanamine-acetaldehyde,
butylated benzoguanamine-furfural,
amylated formoguanamine-formaldehyde,
hexylated acetoguanamine-formaldehyde,
butylated acetoguanamine-formaldehyde,
butylated lauroguanamine-formaldehyde,
heptylated stearoguanamine-formaldehyde,
butylated melamine-formaldehyde, and
butylated N,N-dimethyl melamine-formaldehyde.

Use of a phenol-formaldehyde resin as modifying agent in the polyester materials will often afford improved flexibility, heat aging and mandrel after snap properties. As the phenol-formaldehyde resin there can be used heat reactive condensation products of formaldehyde with phenols such as phenol per se, o-cresol, m-creson, p-cresol, mixed cresols, e.g., cresylic acid and meta para cresol, xylenol, diphenylol propane, p-butylphenol, p-butylphenols such as phenol per se, o-cresol, m-cresol, p-cresol, guanamine, lauroguanamine, stearoguanamine, propioxylenol, diphenylol propane, p-butylphenol, p-tert. amyl phenol, p-octyl phenol, and p,p'-dihydroxy-diphenyl ether. Obviously mixtures of phenols can be used as indicated above.

These phenol-formaldehyde resins are preformed in a conventional manner prior to addition to the polyester.

Modifying the instant polyester with fatty acids and/or oils, for example, of long, medium, or short oil content, provides insulating varnishes especially useful for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors, and other electrical equipment.

Representative fatty oils which may be used for this purpose include the non-drying, semi-drying, and drying fatty oils, including vegetable oils and animal oils, marine oils and treated marine oils, such as soya, cottonseed, hydrogenated cottonseed, linseed, castor, hydrogenated castor, dehydrated castor, coconut, tung, oiticica, menhaden, hempseed, grapeseed, corn, cod-liver, candlenut, walnut, perilla, poppyseed, safflower, conjugated safflower, sunflower, rapeseed, China-wood, tristearin, whale, sardine, herring, etc. oils. Instead of using these oils, it should be understood that for the purposes of the present invention fatty acids or mixtures of fatty acids which make up the fatty oils or their equivalents can be employed.

Representative monocarboxylic acids including fatty acids may be illustrated by the following: abietic acid, benzoic acid, caproic acid, caprylic acid, castor fatty acid, coconut fatty acid, cottonseed fatty acid, crotonic acid, DCO FA, i.e. primarily $CH_3(CH_2)_5CH=CH-CH=CH-(CH_2)_7COOH$, 2-ethyl hexoic acid, lauric acid, linoleic acid, linolenic acid, linseed FA, oleic acid, pelargonic acid, rosin acid (A.N. 165), soya FA, tall oil FA (A.N. 195, A.N. 192), etc.

These oil-modified polyester compositions preferably do not contain a modifying glycol and/or polyol; additionally it is preferable that an oil-soluble resin, such as phenol-aldehyde resins be added. Among the oil-soluble phenol-aldehyde resins which can be used are p-tertiary amylphenol-formaldehyde; p-tertiary butylphenol-formaldehyde; p-tertiary octylphenol-formaldehyde; p-phenylphenol-formaldehyde; 2,2-bis(p-hydroxyphenyl) propane-formaldehyde and o-tertiary butylphenol-formaldehyde. Substituted phenols alone or in conjunction with phenols can be used in forming the oil-soluble phenolic resin.

The oil-soluble phenol-formaldehyde resins are of the heat-reactive type, and are usually employed in an amount of 10% to 80% by weight of the total of the oil modified polyester and phenolic resin, preferably 20-30%. Increasing the amount of phenolic resin speeds the cure but also sacrifices aging characteristics. Hence, the amount of phenolic resin is preferably kept at about 20% by weight. It is also possible to eliminate the phenolic resin from the varnish with resulting loss of the advantages from having the phenolic resin present, and to replace part of the phenolic resin with other heat-reactive resins, e.g., furane resins, triazine resins, urea-formaldehyde, melamine-formaldehyde, and epoxy resins, e.g., bisphenol A-epichlorohydrin resin, although the preferred heat-reactive resins are the phenolic resins since they impart the best combination of improved properties, all things considered. Rosin-modified phenolics are also advantageously employed.

The oil-modified polyester resins can be further modified by employing various resins in conjunction therewith.

Included among such resins are phenol-sulfur resins; phenol-acetylene resins, including resins produced from phenol and substituted phenols, including difunctional, trifunctional, and tetrafunctional phenols, naphthols, bis-phenols, salicyclic acid and salicylates, etc.; modified phenolic resins, including phenol-terpene resins, phenol-terpene-aldehyde resins, phenol - naphthalene - aldehyde resins, phenol-urea-formaldehyde resins, phenol-aniline-formaldehyde resins, phenol-glycerol resins, etc.; non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hydrogenation of phenolic resins, and the like.

In addition to the resin components, the insulating varnish also includes one or more solvents, such as xylene, mineral spirits, isophorone, naphtha, toluene, etc.

Insulating wire enamels containing the homopolymer-polyester, either unmodified or modified in any of the variety of ways discussed hereinbefore, are applied to various electrical conductors and other components according to standard procedures well known to those skilled in the art.

Coated conductors with improved characteristics such as flexibility, heat resistance and abrasion resistance, are obtained by modifying the coating and the manner in which it is applied in accordance with generally familiar considerations, for example by providing multiple coating of varying composition. In this manner, it is often desirable to provide the electrical conductor with a first continuous coating of the instant polyester compositions, either modified or unmodified, and a second continuous coating of polyethylene terephthalate.

In other circumstances, it may be desirable to provide the electrical conductor with a continuous inner dielectric coating of a non-linear thermosetting resin and a thin, uniform continuous outer dielectric coating of a non-linear branched polyester composition of the instant invention. This configuration will often permit reduction on the number of coatings required to eliminate heat shock and thermal shock without detracting from the desirable qualities of the insulation.

These and other coating configurations known in the art may be used with the instant homopolymer-polyesters to afford superior insulation of electrical conductors.

Use of an unsaturated polycarboxylic acid in preparing polyesters from the homopolymer affords compositions suitable for laminates, casting resins, etc. For this purpose an appropriate cross-linking monomer is added to the composition, e.g., styrene, $\alpha$-methylstyrene, methyl methacrylate, diallyl phthalate, triallylisocyanurate, triallylcyanurate, ethylene glycol dimethacrylates and homologs thereof, diethylene glycol divinyl ether, alkyl vinyl ethers, alkyl acrylates, etc. A suitable initiator, for example peroxide initiators, should be used to facilitate cure, and also promoters.

It has been found that copolymerizing the polyesters of the homopolymer with a polycarboxylated imide affords an ester-imide resin with superior electrical insulating qualities.

The imide ring-containing compound can be formed by reacting (a) an aromatic carboxylic anhydride which, in addition to 5-membered anhydride ring, contains at least one further reactive site, e.g., carboxyl group, carboxylic anhydride group or a hydroxyl group and (b) a primary amine containing at least one further reactive group, e.g., carboxyl or hydroxyl or an additional primary amino group. The anhydride group of the aromatic carboxylic compound might be replaced with two adjacent carboxyl groups, or the esters, semiesters or semiamides thereof. The primary amine may be replaced with its salt, amide, lactam or polyamide so long as the bound primary amino group is capable of forming an imide.

Among the aromatic carboxylic compounds which may be used are pyromellitic anhydride, trimellitic anhydride, naphthalene tetracarboxylic dianhydrides and dianhydrides of tetracarboxylic acids containing two benzene nuclei wherein the carboxyl groups are in the 3,3'- and 4,4'-positions.

Examples of primary amino compounds which may be used are the aliphatic diprimary diamines, e.g., ethylene diamine, tetramethylene diamine, hexamethylene diamine, nonamethylene diamine, and aromatic diprimary diamines, e.g., benzidine, diaminodiphenyl methane, diaminodiphenyl ketone, sulfone, sulfoxide, ethers and thioethers, phenylene diamine, toluylene diamine, xylylene diamine, as well as diamines containing three benzene nuclei, e.g., bis-(4-aminophenyl-$\alpha$,$\alpha'$-p-xylene or bis-(4-aminophenoxy)-1,4-benzene, and also cycloaliphatic diamines, e.g., 4,4'-dicyclohexylmethane diamine. Amino alcohols may be used, e.g., monoethanolamine, monopropanolamines or dimethylethanolamine, as well as aminocarboxylic acids, e.g., glycine, aminopropionic acids, aminocaproic acids, or amino-benzoic acids.

The ester-imide resins thus afforded provide superior lacquers for coating electrical wires, which stand up well to thermal shock.

It is understood throughout that among the modifying alcohols which may be advantageously employed in the polyester compositions is the monomer tris(2-hydroxyethyl)isocyanurate itself, which is a trihydric alcohol. The monomer may be used in any proportion with the homopolymer in making up the basic polyester, and may also be added to the homopolymer-polyester in the same manner as other trihydric modifying alcohols are added to the polyester compositions.

This detailed description of the invention has been largely directed to the specific use of tris(2-hydroxyethyl)isocyanurate homopolymer and polyesters derived therefrom. However, while the hydroxyethyl compound is the preferred isocyanurate, other tris(2 - hydroxyalkyl)isocyanurates may be used in a similar manner.

The following examples are provided to more fully illustrate the instant invention. They are provided for illustrative purposes only and are not to be construed in any way as limiting the scope of the invention, which is defined by the appended claims.

EXAMPLE I (A) Tris(2-hydroxyethyl)isocyanurate homopolymer

Tris(2-hydroxyethyl)isocyanurate homopolymer is prepared according to the procedure of Example I of U.S. Pat. 3,293,224. The reaction is terminated when the water of condensation is about 8.5 ml., which closely approximates theoretical 0.5 mol of water per mol isocyanurate charged. The resulting homopolymer is the same material as that prepared in Example I of U.S. Pat. 3,293,224.

(B) Polyester of tris(2-hydroxyethyl)isocyanurate homopolymer and terephthalic acid To the contents of the reaction vessel of part (A) above, is added 45 ml. of Solvesso 100, 25 ml. of xylol and 1.0 g. of tetraisopropyl titanate. Dimethyl terephthalate (129 g.) is then charged into the vessel and the mixture is heated to about 180° C. for a period of 5 hours. The resulting polyester is isolated by stripping solvent and cooling to room temperature. The polyester is soluble in cresylic acid.

EXAMPLE II

Wire enamel

The procedure of Example I is repeated wherein the following reaction mixture is used in part (B).

| | |
|---|---|
| Homopolymer, g. | 250 |
| Ethylene glycol, g. | 60 |
| 1,4-butanediol, g. | 34 |
| Dimethyl terephthalate, g. | 340 |
| Litharge, g. | 0.15 |
| Solvesso, ml. | 80 |
| Xylol, ml. | 35 |

After reaction, the product is reduced to about 50% solid with cresylic acid.

A wire enamel is prepared by mixing 239 grams of the cresylic acid composition, 39 grams of Mondur SH, 124 grams of cresylic acid, 130 grams of Solvesso 100 and 8.4 grams of 9% zinc octoate in E.W. naphtha. This wire enamel is applied on 18 gauge copper wire.

EXAMPLE III (A) Oil-modified alkyd

Into a heated resin kettle equipped with an agitator and inert gas sparger are charged 214 g. of coconut oil and 69 parts of glycerine. The contents are heated to 170° C. and 2 g. of calcium naphthenate is added. The temperature is then raised to 238° C. over one hour. During the reaction, a slow stream of carbon dioxide is continuously introduced to blanket the reaction. The alcoholysis is continued for about 30 minutes at 238–240° C. until the monoglyceride has compatibility with methanol greater than 3:1. The temperature is then reduced to 180° C. and 47 g. of ethylene glycol, 273 g. of phthalic anhydride, 33 g. of glycerine and 105 g. of homopolymer (prepared as in Example I-(A)) are charged. The temperature is raised to 240° C. while water of condensation is continuously removed overhead. The heating is continued at 240° C. for about 4 hours, after which time the resulting oil-modified alkyd is cool and dissolved in xylene to 55% resin solids content.

(B) Varnishes

The oil-modified alkyd in xylene of part (A) is used in the following blends to afford excellent coating varnishes:

(1)

| | Parts |
|---|---|
| Alkyd in xylene | 70 |
| Butylated melamine-formaldehyde resin (Plaskon 3385) | 25 |

(2)

| | Parts |
|---|---|
| Alkyd in xylene | 7 |
| Phenolic-formaldehyde resin, as prepared in Example 10 of U.S. Pat. No. 3,312,645 | 10.5 |

EXAMPLE IV (A) Imide-containing reactant

Commercial cresol (1100 g.) is placed in a reaction vessel equipped with a stirrer and thermometer, and the temperature is raised to 150° C. Trimellitic anhydride (230 g.) is added in portions until it is completely dissolved, and then 119 g. of 4,4'-diaminodiphenylmethane is introduced. Heating is continued for 8 hours at 140–150° C., and then the reaction mixture is cooled. The resulting precipitate is recovered by filtration to afford the desired imide ring-containing product, which is washed with alcohol and ether, then dried.

(B) Ester-imide copolymer

The following blend is charged into a resin kettle equipped with stirrer, distillation condenser and thermometer:

| | |
|---|---|
| Homopolymer (as in Example I-(A)), g. | 230 |
| Ethylene glycol, g. | 305 |
| Dimethyl terephthalate, g. | 780 |
| Litharge, g. | 0.3 |
| Solvesso 100, ml. | 100 |
| Xylol, ml. | 180 |

The mixture is heated to 210° C. over a 7½ hour period and then vacuum is applied to remove the residual water of condensation and solvents. The temperature is then adjusted to 175° C. and 140 g. of the imide ring-containing product of part (A) is added. The temperature is then raised to 185° C. and when the imide is nearly taken up by the polyester, an additional 140 g. of imide product is slowly added while raising the temperature to 218° C. Then 3 g. of cadmium acetate is added and the reaction is continued for an additional 3 hours at 215–220° C., and finally under vacuum. The resulting ester-imide resin is then dissolved in 870 g. of commercial cresol and a solution of 16 g. of butyl titanate in 30 g. of cresol is added. The resulting lacquer is diluted with a mixture of solvent naphtha and cresol until resin solids content is 30%.

EXAMPLE V

Cross-linking coating resin

The polymerization reaction of Example II is repeated wherein the dimethyl terephthalate is replaced with an equivalent amount of acid mixture consisting of a 50:50 mol mixture of maleic anhydride/phthalic anhydride. The resin is cooled and diluted with styrene in an amount of 30 parts styrene per 70 parts resin. One-half percent of benzoyl peroxide initiator is added to afford the cross-linking coating resin.

EXAMPLE VI

Tris(2-hydroxyethyl)isocyanurate homopolymer

An aluminum-lined reactor fitted with stirrer, thermometer, reflux condensor and Barrett trap was charged with 261 parts of tris(2-hydroxyethyl)isocyanurate, 65 parts water and 3 parts p-toluenesulfonic acid. It was then heated until the isocyanurate dissolves and 30 parts xylene were added thereto. The reactor was heated to reflux and water azeotroped off to produce the desired homopolymer. Approximately 0.6 mol of water of condensation was removed per mol of monomer. The following table indicates the rate at which water was azeotroped:

| Time, min. | Reaction temp., ° C. | Parts H₂O removed |
|---|---|---|
| 0 | 40 | 0 |
| 20 | 100 | 5 |
| 35 | 103 | 22 |
| 45 | 111 | 33 |
| 60 | 114 | 49 |
| 70 | 123 | 59 |
| 125 | 177 | 66 |
| 150 | 205 | 74 |
| 162 | 205 | 76 |

EXAMPLE VII

The procedure of Example VI was repeated wherein 3 parts of concentrated sulfuric acid was substituted for said p-toluenesulfonic acid. One-half mol of water of condensation was removed per mol of isocyanurate monomer. The rate at which water was removed is indicated in the following table.

| Time, min. | Reaction temp., ° C. | Parts H₂O removed |
|---|---|---|
| 0 | 45 | 0 |
| 27 | 102 | 14 |
| 33 | 109 | 24 |
| 48 | 115 | 39 |
| 58 | 121 | 49 |
| 75 | 139 | 62 |
| 92 | 151 | 71 |
| 102 | 150 | 74 |

EXAMPLE VIII

The procedure of Example VI is repeated wherein the water and catalyst are brought to reflux prior to addition of the isocyanurate monomer thereto, resulting in faster dissolution of the isocyanurate than in Example VI.

What is claimed is:

1. A coating composition comprising a polyester reaction product of a homopolymer of a tris(2-hydroxyalkyl) isocyanurate from which between about 0.20 and 0.60 mol of water of condensation per mol isocyanurate is eliminated, wherein each 2-hydroxyalkyl group contains between 2 and 4 carbon atoms, and an unsaturated polycarboxylic acid; an ethylenically-unsaturated cross-linking agent; and a peroxide cross-linking initiator, said coating composition being soluble in coating solvents.

2. The composition of claim 1 wherein the isocyanurate of said polyester reaction product is tris(2-hydroxyethyl) isocyanurate.

References Cited

UNITED STATES PATENTS

| | | | |
|---|---|---|---|
| 2,915,493 | 12/1959 | Nischk et al. | 260—45.4 |
| 3,174,950 | 3/1965 | Cordier | 260—77.5 |
| 3,248,373 | 4/1966 | Barringer | 260—77.5 |
| 3,293,224 | 12/1966 | Fitzwilliam | 260—77.5 |
| 3,342,780 | 9/1967 | Meyer et al. | 260—75 |

FOREIGN PATENTS

| | | | |
|---|---|---|---|
| 1,339,547 | 9/1963 | France | 260—77.5 UX |
| 1,474,763 | 2/1967 | France | 260—77.5 UX |

OTHER REFERENCES

Saunders et al.: Polyurethanes, part I, Interscience, New York (1962), pp. 45–46.

DONALD E. CZAJA, Primary Examiner

H. S. COCKERAM, Assistant Examiner

U.S. Cl. X.R.

8—116.2; 161—190; 260—2 EP, 18 TN, 27, 31.2 N, 31.2 XA, 33.4 R, 33.4 P, 33.6 R, 33.6 UA, 46.5 R, 51 R, 67 F, 67.6 R, 69 R, 70 A, 75 M, 75 N, 75 NK, 77.5 NC, 78 TF, 224, 858, 859, 860